(12) United States Patent
Patterson (10) Patent No.: US 7,161,560 B2
(45) Date of Patent: Jan. 9, 2007

(54) SHOULDER MOUNTED DEVICE WITH EYE-CONFRONTING PORTION FORWARDLY OF A USER'S EYES

(75) Inventor: John W. Patterson, 20819 229th Ave. SE., Maple Valley, WA (US) 98038

(73) Assignee: John W. Patterson, Maple Valley, WA (US)

( * ) Notice: Subject to any disclaimer, the term of this patent is extended or adjusted under 35 U.S.C. 154(b) by 111 days.

(21) Appl. No.: 10/187,104

(22) Filed: Jul. 2, 2002

(65) Prior Publication Data

US 2004/0004582 A1 Jan. 8, 2004

(51) Int. Cl.
*G09G 5/00* (2006.01)

(52) U.S. Cl. ............................................. 345/7; 345/8

(58) Field of Classification Search .................... 345/7, 345/8; 348/115; 349/11; 359/13
See application file for complete search history.

(56) References Cited

U.S. PATENT DOCUMENTS 5,276,471 A * 1/1994 Yamauchi et al. .......... 351/153
6,234,446 B1 * 5/2001 Patterson .................... 248/694
6,798,391 B1 * 9/2004 Peterson, III ................. 345/8

* cited by examiner

*Primary Examiner*—Jimmy H. Nguyen
(74) *Attorney, Agent, or Firm*—Delbert J. Barnard (57) ABSTRACT

A collar (10, 110) is placed around the neck of a user (14) and is rested on the user's shoulders (16) with forward end portions (18, 20, 122, 124) of said collar (10, 110) resting on an upper part of a user's chest. Riser arms (22, 24 or 138, 140, 134 and 142, 146, 150) extend from front end portions (18, 20 or 122, 124) of the collar (10, 100) to a video viewer (34, 130) that is positioned in front of the user's eyes. The riser arms may extend substantially straight upwardly from the front end portions (18, 20) of the collar (10, 110). Or, a lower portion (138, 140) of each arm may extend upwardly and rearwardly from the end portions (18, 20 or 122, 124) to about the level of the user's ears, and then an upper portion may extend forwardly and upwardly from that level to the video viewer (130). The collar (10, 110) and riser (12, 112) portions of the unit are foldable into a compact configuration for stowage.

24 Claims, 8 Drawing Sheets

SHOULDER MOUNTED DEVICE WITH EYE-CONFRONTING PORTION FORWARDLY OF A USER'S EYES

RELATED APPLICATION

This application claims benefit to the filing date of U.S. Provisional Application Ser. No. 60/301,916, filed Jun. 29, 2001, and entitled "Shoulder Mounted Audio/Video Device."

TECHNICAL FIELD

This invention relates to a shoulder-mounted device that positions a portion of the device immediately in front of the eyes of the user. More particularly, it relates to such a device that is personal to the user and is mounted on the shoulder's of the user. By way of example, the device may be a personal video only unit, or an audio/video unit, or binoculars, or an instrument that examines the eyes of the user, or some other device that includes a portion that needs to be positioned in front of the user's eyes.

BACKGROUND OF THE INVENTION

A personal audio/video entertainment system that is in the prior art is disclosed by my U.S. Pat. No. 6,234,446, granted May 23, 2001, and entitled "Personal Audio/Video Entertainment System." This patent sets forth a comprehensive description of known audio/video entertainment systems that are personal to the user. It also identifies several prior art patents and devices. Consequently, that background information will not be repeated herein but rather is hereby incorporated herein by this specific reference.

BRIEF SUMMARY OF THE INVENTION

The present invention includes providing a device, e.g. a personal video unit, that is basically characterized by a collar that is adapted to circumscribe or extend about a user's neck and set down on the user's shoulders and chest, and by a riser that is connected to and extends upwardly from the collar. A video viewer or some other eye-confronting unit is incorporated into an upper portion of the riser. When the collar is positioned on a user the eye-confronting unit, e.g. a video viewer, is positioned immediately forwardly of the eyes of the user.

The present invention includes providing a collar that has left and right forward end portions and a riser that has left and right arms. The left and right arms include left and right upper end portions and left and right lower end portions. The lower end portions are connected to the left and right forward end portions of the collar. The eye-confronting unit, e.g. video viewer, extends between and is mechanically attached to the left and right upper end portions of the arms of the riser.

According to a feature of the invention, the collar is U-shaped and is adjustable in size to conform to the user's neck.

According to another feature of the invention, the U-shaped collar includes left and right end sections and a rear section that is telescopically connected to the left and right sections.

A further feature of the invention is to provide a personal video unit in which left and right forward end portions of a U-shaped collar are adjustably connected to the left and right lower end portions of a riser. Preferably, the riser has left and right arms that are adjustable in length. The riser arms may have upper and lower sections and a telescopic connection between the upper and lower sections. This provides for adjustment of the video viewer in position relative to the eyes of the user.

In the preferred embodiment, the video viewer (or other eye-confronting unit) is pivotal in position relative to the left and right upper end portions of the arms of the riser. Preferably, an earphone is provided that is connectable to the user's ear. An audio cord extends from the earphone to the video viewer.

In a preferred embodiment, the left and right forward end portions of the U-shaped collar are pivotally connected to the left and right lower end portions of the riser. The pivotal connections permit pivotal movement of the riser in position relative to the U-shaped collar.

According to yet another feature of the invention, the left and right arms of the riser have upper and lower sections that are pivotally connected together. The lower sections of the arms are adapted to, during use, extend upwardly and rearwardly from the left and right lower end portions of the riser to the pivotal connection. The lower sections are adapted to, in use, extend upwardly and forwardly from the pivotal connection to the video viewer.

An object of the invention is to provide a personal video unit having a substantially U-shaped collar section or collar and a substantially U-shaped riser section which are pivotally connected together and are movable together and apart. When they are together the substantially U-shaped collar section is positioned inside of and is contiguous the substantially U-shaped riser section.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

Like reference numerals are used to designate like parts throughout the several views of the drawing, and.

DETAILED DESCRIPTION OF THE INVENTION

The device of the present invention can be used for mounting different things forwardly of the user's eyes. A preferred use of the collar and riser structure is to mount a video unit or module, with or without an audio, into a use position immediately forwardly of the eyes of the user. However, the device can also be used for mounting other units forwardly of the user's eyes, such as instrumentation for looking into the user's eyes and conducting various examinations of the eyes. Because a video/audio device is a preferred device, embodiments of such a device will are described herein in connection with the drawing FIGS. 1–12.

Figure 1:
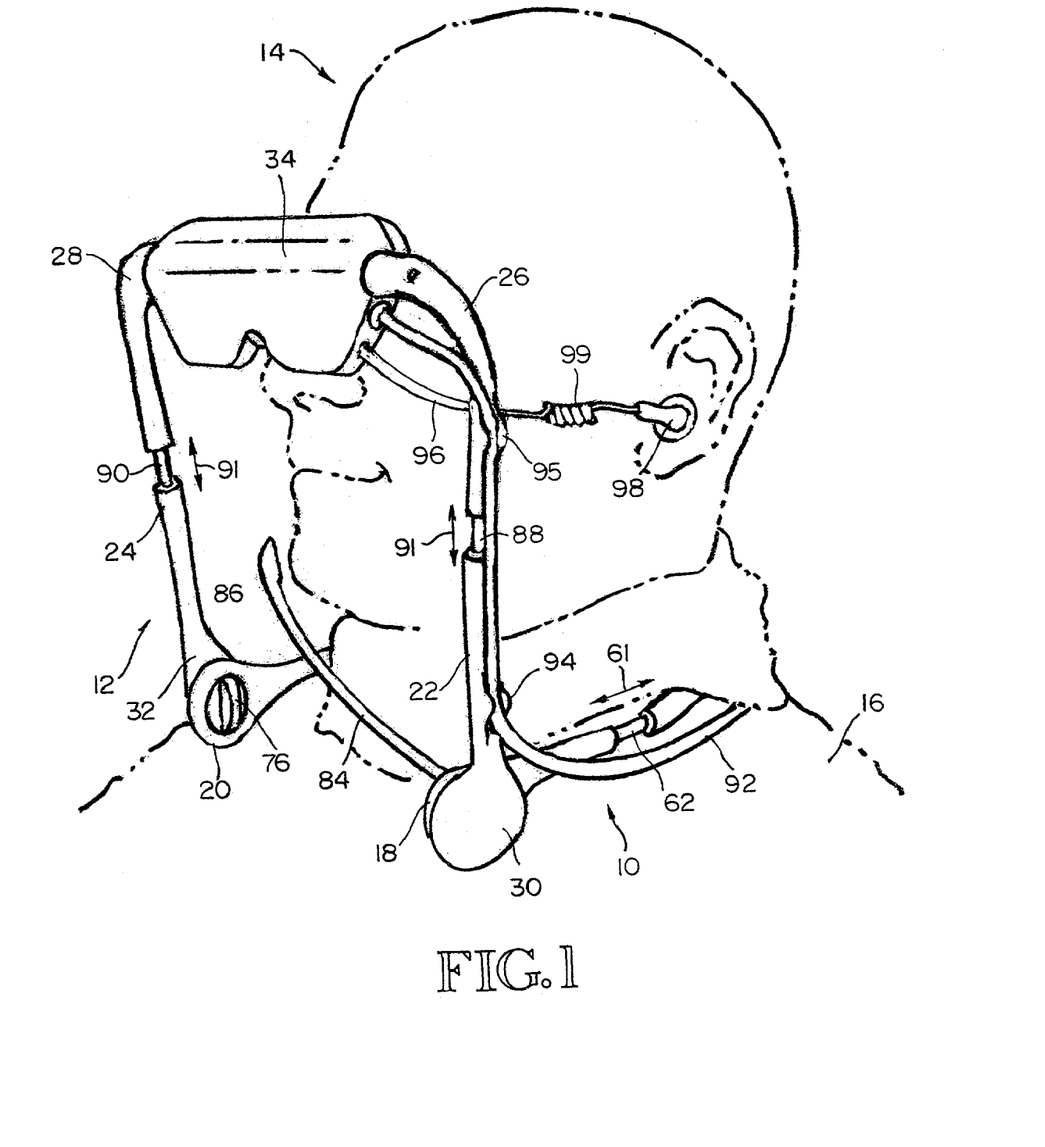
FIG. 1 is a pictorial view of a first embodiment of the invention shown positioned on the shoulder's of a user, with a video viewer positioned immediately forwardly of the eyes of the user.

Referring to FIG. 1, the personal video unit that is illustrated comprises a substantially U-shaped collar 10 and a substantially U-shaped riser 12. The collar 10 is adapted to extend around the neck of a user 14 and set down on the user's shoulders 16. The collar 10 has left and right forward end portions 18, 20. The riser has left and right arms 22, 24 that include left and right upper end portions 26, 28 and left and right lower end portions 30, 32. The left and right forward end portions 18, 20 of the collar 10 are connected to the left and right lower end portions 30, 32 of the arms 22, 24. A video viewer 34 extends between the left and right upper end portions 26, 28 of the arms 22, 24 of the riser 12. As illustrated, when the collar 10 is positioned on the user 14, the video viewer 34 is positioned forwardly of the eyes of the user 14.

The substantially U-shaped collar 10 may also be referred to as a "base." At its rear, it rests against the nape of the neck. It then curves around the neck and slopes forwardly and downwardly along the upper chest of the user 14 to the forward end portions 18, 20, which contact the user's chest. The collar 10 and its constituent parts support the entire weight of the personal video unit upon the user's lower neck, shoulders and chest. At least to some extent, the forward end portions 18, 20 of the collar 10 hang from the rest of the collar 10 similar to the way a pendant hangs from a chain that extends around a wearer's neck. The weight of the riser bears down on the front end portions 18, 20 of the collar 10. This weight transfer from the riser 12 to the collar 10 and from the collar 10 to the user's chest and shoulder's 16 permits pivotal adjustment of the riser 12 relative to the collar 10 while maintaining stability of the unit. The riser 12 may be adjusted to place the video viewer 34 in front of the eyes of the user 14 and the video viewer 34 will stay in this general position even while the user 14 turns and/or nods his/her head.

Figure 4:
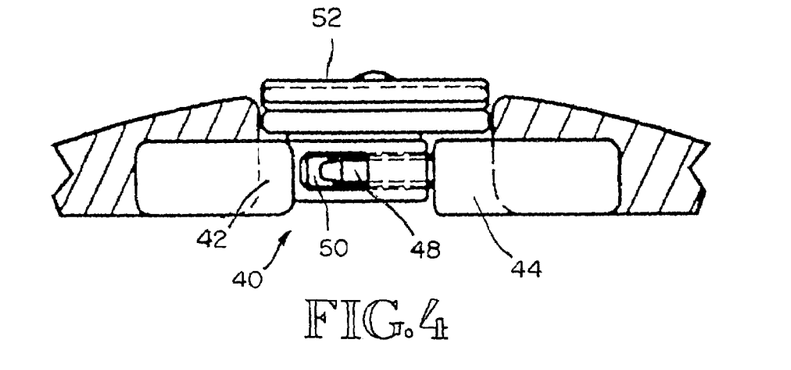
FIG. 4 is an enlarged scale fragmentary view of a center region of the collar section, with some parts shown in elevation and others shown in section.
Figure 5:
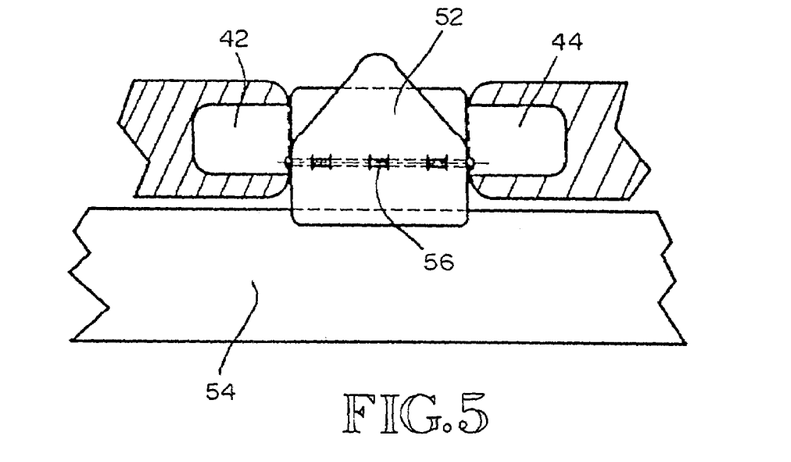
FIG. 5 is an enlarged scale rear view showing a connection in a connected position.
Figure 6:
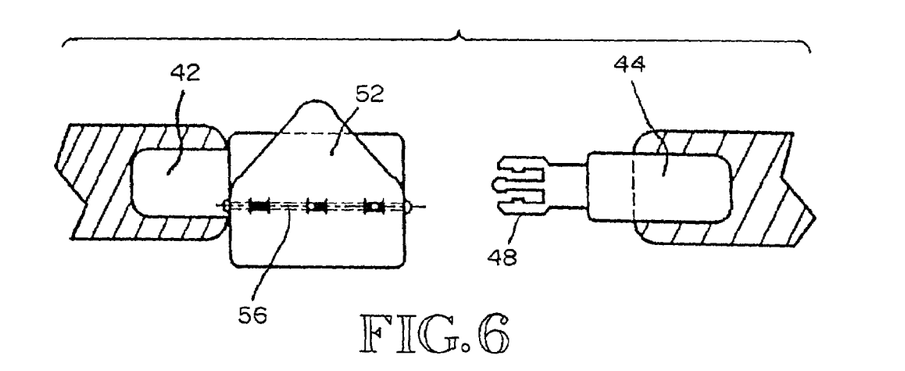
FIG. 6 is a view like FIG. 7, but showing the connection in a disconnected condition.

Collar 10 may comprise symmetrical, left and right side members 36, 38 (FIG. 2) that are connected together at the center 40 of the collar 10. The center connection 40 may comprise left and right connector members 42, 44. FIG. 4 is a plan view of the connection 40. FIGS. 5 and 6 are rear elevational views of the connection 40. FIG. 5 shows the connectors 42, 44 connected together. FIG. 6 shows the connectors 42, 44 disconnected. Connector 42 may include a socket and member 44 may include a plug that extends into the socket. When the plug 44 is within the socket 42, it is frictionally gripped by internal portions of the socket so that the connection 40 is secure until force is applied to pull the connectors 42, 44 apart. The frictional grip is releasable in response to a moderate tug on the plug 44, so that in response to such tug, the plug 44 is pulled out from the socket 42. For example, the connector 44 may include a plug 48 that is insertable into a socket 50 (FIG. 4) formed in the connector 42. The plug 48 may be of split construction, as shown by FIG. 6, so that it is laterally compressible. When it is pushed into the socket, its parts are compressed from contact with the socket wall. This bends the parts, making them act like springs. As plug 48 enters into the socket, the plug members exert a frictional force on the walls of the socket. In another embodiment, the plug 48 may be constructed like a well-known "jack" that has an enlarged end portion and a narrower portion inwardly of the end portion. The socket includes a spring-like receptor for the jack that frictionally grips it and holds it in the socket. As will be appreciated, a number of other ways of connecting the side parts 36, 38 can be employed in place of the plug and socket 44, 42. For example, a hook and eye fastener such as Velcro® can be used to make the connection 40.

A member 52 may be connected to the member 42 and used to connect the collar 10 to the collar 54 on a shirt or jacket that is worn by the user 14. This connection of the mid portion of the collar 10 to the shirt or jacket collar will stabilize the unit against for and aft side-to-side movement of the user's head. It will also counter any tendency of the video viewer to tilt forwardly.

The connector 52 may be a generally U-shaped spring that clips onto the collar 54 the way the well-known tie clasp clips onto a necktie and the front of a person's shirt. Or, it may be of two-part construction wherein the two parts are interconnected by a torsion spring 56 that normally biases clip-end portions of the connector 52 into contact with each other. The opposite ends are spaced apart. When these opposite ends are squeezed together, the clip-ends move apart, allowing the collar 54 to be inserted between them. After this insertion is made, the squeezing force is removed from the opposite end portions, allowing the spring 56 to move the clip-ends into clamping engagement with the collar 54. Of course, this connection can be made in a number of other ways.

The collar members 42, 44 may include rigid shafts 60, 62 having first ends which are located inside of the members 42, 44 and physically attached, (e.g. molded) to the members 42, 44. The shafts 60, 62 project outwardly from the members 42, 44. These projecting end portions of the shafts 60, 62 are telescopically received in forward portions 64, 66. The members 64, 66 are constructed so that they will frictionally grip the members 60, 62 but will allow the members 60, 62 to move inwardly and outwardly from the members 64, 66, in response to push and pull forces applied to the members 42, 64 and 44, 66. This telescopic adjustment of the members 60, 62 within the members 64, 66 provides a way of adjusting the length and shape of the collar 10. This is desirable so that the collar 10 can be adapted to the neck and shoulders of size users 14 with different neck sizes. In another embodiment, the collar portions 42, 44 may be adjustably connected to the collar portions 64, 66 in some other way so long as a length adjustment is achievable between the back of the collar 10 and the collar front ends 18, 20. See, for example, member 9 in my aforementioned U.S. Pat. No. 6,234,446.

Figure 3:
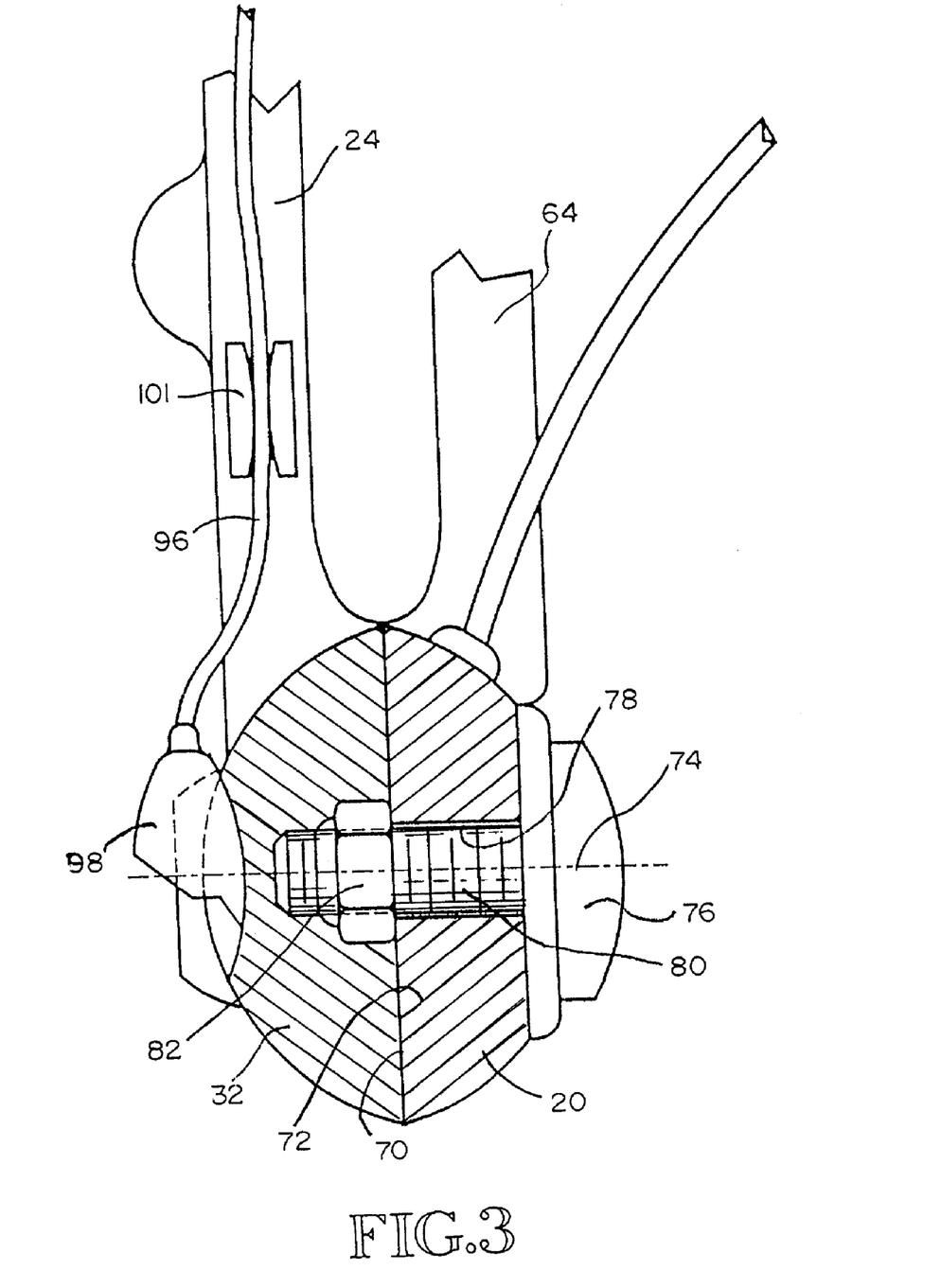
FIG. 3 is an enlarged scale fragmentary view of a pivotal connection between a forward end portion of the collar and a lower end portion of a riser arm, with some parts in section and others in elevation.

FIG. 3 shows some detail of the connection between collar end member 20 and riser end member 32. This same connection is employed between members 18, 30 and for this reason only one of the connections is illustrated. End member 20 includes an inner side 70 that contacts an inner side 72 on member 32. The sides 70, 72 are generally planar. However, they may be textured surfaces or may include inter engaging locking teeth that extend radially outwardly from the axis 74. An adjustment screw 76 is shown extending through an opening 78 in member 20. Screw 76 has a threaded shaft portion 80 that screws into threads carried by the member 32. For this purpose, a nut 82 may be embedded into the member 32, with the threads of the nut being positioned to engage the threads on the shaft 80. FIG. 1 best shows the construction of the handle portion of the adjustment screw 76. When it is desired to make an adjustment, the screw 76 is loosened, allowing member 20 to be swung about axis relative to member 32. When the desired relative position of the members 20, 32 is achieved, the nut 76 is tightened so as to connect the members 20, 32 together. If the locking teeth are used, the adjustment screws 74 must be loosened to such an extent that the members 20, 32 will separate until the teeth are no longer engaged. Then, following adjustment, when the adjustment screw 76 is tightened, the sides 70, 72 will move together and the locking teeth will again become engaged.

The connection that is illustrated and described above is presented by way of non-limitive example. In another embodiment, the two sides 70, 72 may be generally flat and the tightening of the adjustment screw 76 will move them into a frictional engagement with each other. Of course, there are numerous other ways of providing the adjustable connection between the members 18, 30 and the members 20, 32.

Referring to FIG. 1, a microphone arm 84 may be connected at one end to one of the end members 18, 30 and carry a microphone 86 at its opposite end. Arm 84 may be bendable for purposes of adjusting the position of the microphone 86. What is important is that the arm 84 is adjustable for allowing placement of the microphone 86 in a proper position relative to the mouth of the user 14.

Preferably, the riser end portions 26, 28 are adjustable in position relative to the riser end portions 22, 24. Telescopic shafts 88, 90 may be used to provide the adjustment. Shafts 88, 90 may have lower end portions that are insertable into, and are connected to, the riser end portions 22, 24, with the remaining portions of the shafts 88, 90 being telescopically received in the riser end portions 26, 28. Or, the shafts 88, 90 may be connected to the end portions 26, 28 and telescopically received within the end portions 22, 24. What is necessary is that the end portions 26, 28 be movable up and down relative to the end portions 30, 32. The telescopic portions of the shafts 88, 90 make a frictional fit with the end portions in which they fit. The friction forces can be overcome by the user applying either a push or a pull on the upper part 26, 28, 34 relative to the lower part 22, 24. Whenever this force is removed, the frictional forces will hold the upper and lower parts of the riser 12 in the position in which they have been placed relative to each other. In FIG. 1, arrows 61, 91 show where adjustment occurs. The gap regions include the rods 62, 88, 90. The portions of the collar 10 and the riser arms 22, 24 that are situated on opposite sides of these gap regions are movable together and apart.

Figure 2:
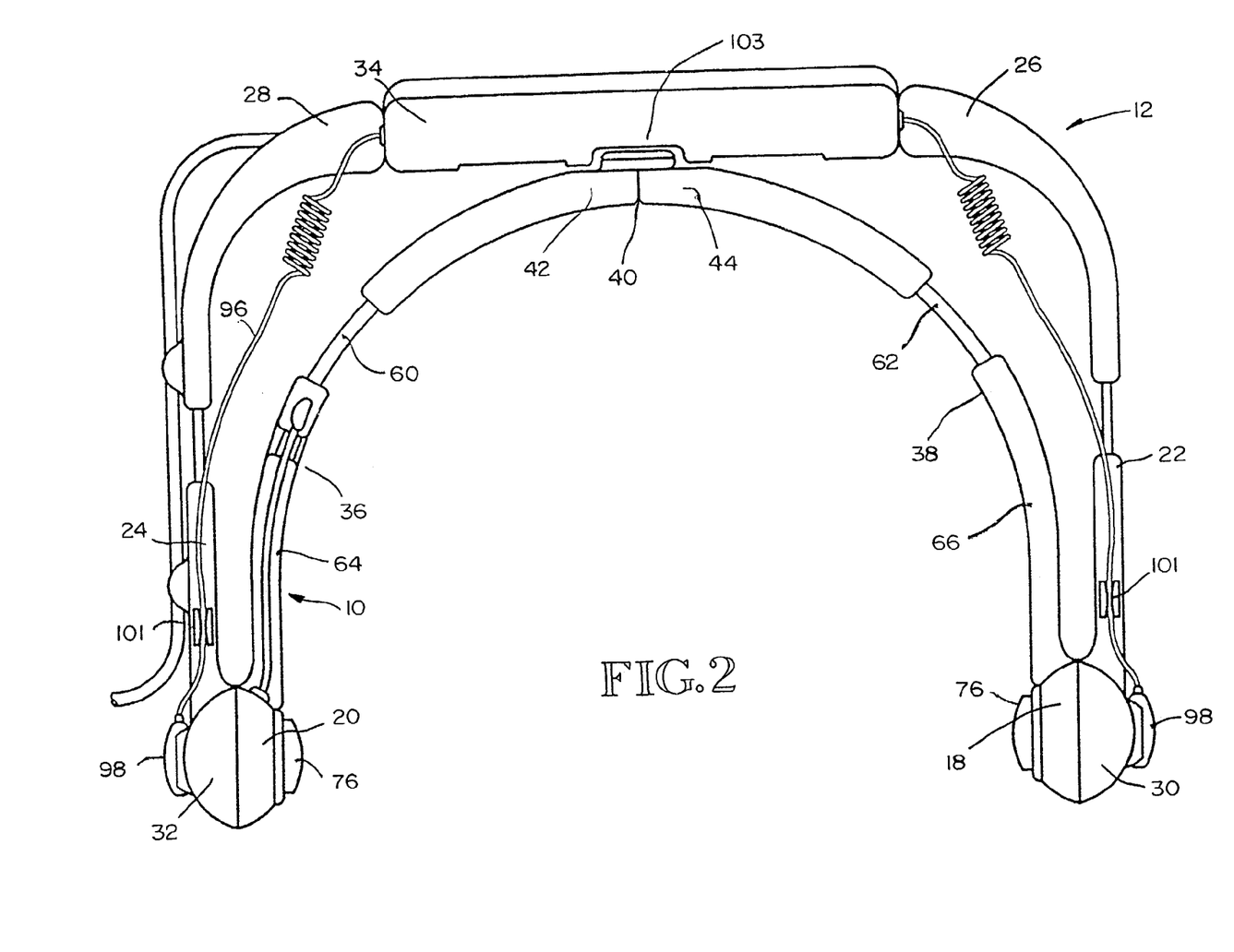
FIG. 2 is a plan view of the personal video unit shown by FIG. 1, laid down on one side, in a folded or stowed configuration, in which a collar section of the unit is within a riser and video viewer section.

The necessary power/signal cables may be routed either externally or internally of the collar and riser members. FIG. 1 shows a cable 92 that extends forwardly of the back of the user 14 to a clip 94 on member 22, and from clip 94 to clip 95 on member 26, and from clip 95 up to the video viewer 34. As illustrated, clips 94 and 95 each consist of two spaced apart members between which a portion of the cable 92 can be fitted. The fit is a frictional fit that holds the cable 92 in position relative to the clip 94. Another cable 96 is shown extending from the video viewer 34 to an earphone 98 that fits in the ear of the user. Cable 96 may include a coiled section 99 making it adjustable in length. As shown by FIG. 2, the device may include two earphones 98, one for each ear, and a cable 96 extending from each earphone 98 to the video viewer 34. FIGS. 2 and 3 show the earphones 98 is a stowed position. They are constructed to make a plug-in or plug-on engagement with portions 30, 32 of the riser 12. Preferably, the members 22, 24 include a clip 101 configured to engage and clamp onto a cable 96 (see FIG. 3). Referring to FIG. 2, the central rear region 103 of the unit 34 preferably includes a pliable nose pad. The unit 34 does not actually rest on the user's nose but there may be some contact between it and the user's nose. The pliable nose pad 103 cushions any contact that may occur.

Figure 7:
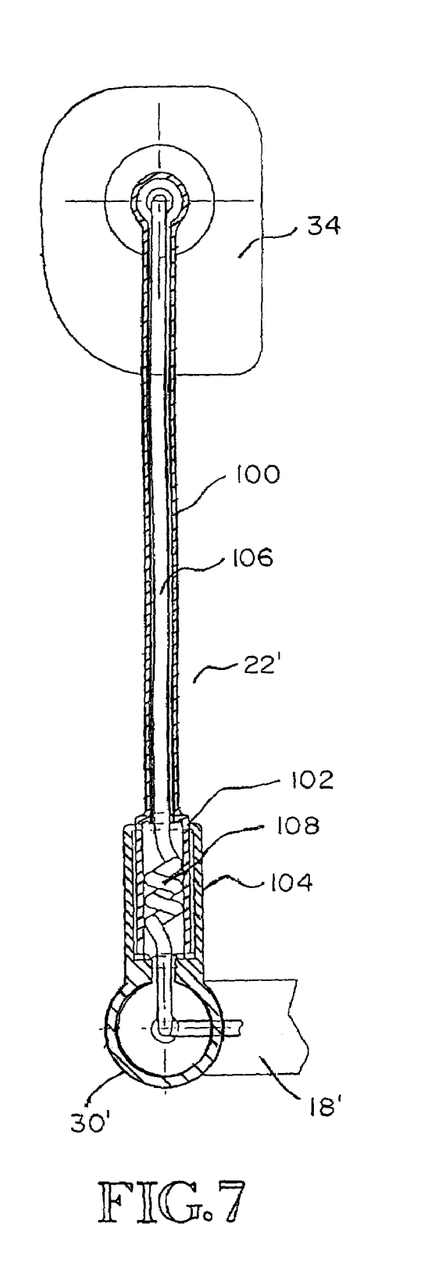
FIG. 7 is a fragmentary view of a riser arm, showing one way of constructing the riser arm so that it is adjustable in length, such view showing the arm in a retracted position and showing internal routing of wiring.
Figure 8:
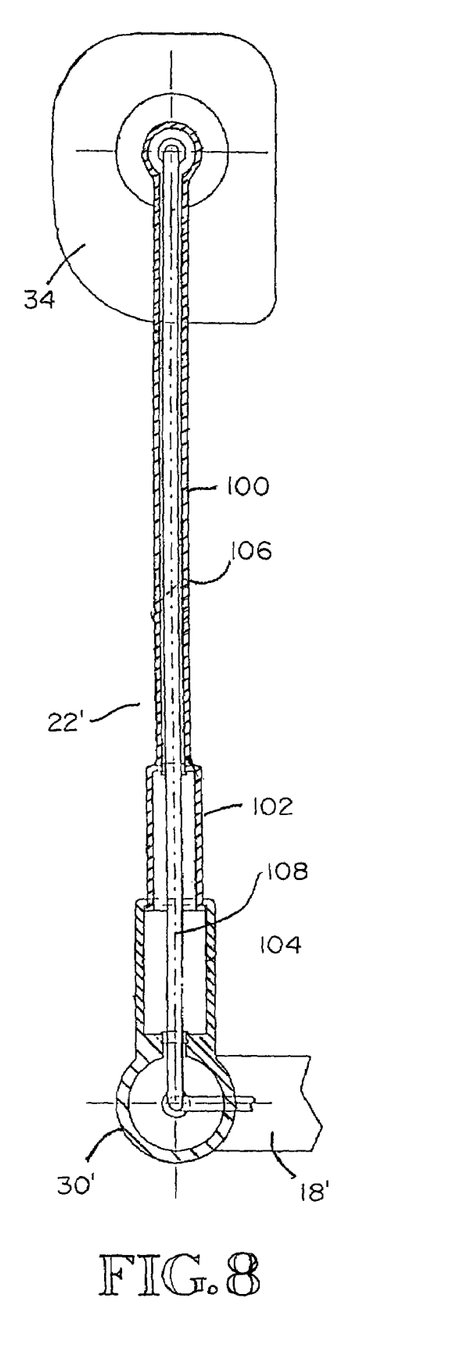
FIG. 8 is a view like FIG. 3 but showing the arm in an extended position.

FIGS. 7 and 8 show an alternate construction of the riser arms. In these views, riser arm 22' is illustrated. This arm 22' is a telescopic member having sections 100, 102, 104. Section 102 telescopically moves into and out from section 104. In this embodiment, the power/signal cable 106 is located within the telescopic arm 22'. It includes a helical section 108 when the arm 22' is retracted, as shown by FIG. 7, the helical section 108 is contracted and has a helical form. When the arm 22' is extended, as shown by FIG. 8, the helical section 108 is straightened, allowing it to become longer in response to the length of the arm 22'.

FIG. 1 illustrates the use position or mode of the unit 10, 12. The collar 10 is around the neck of the user 14 and rests on the user's shoulder and on the upper portion of the user's chest. The riser 12 extends upwardly from the forward end portions 18, 20 of the collar 10 and the video viewer 34 is positioned immediately in front of the eyes of the user 14. FIG. 2 shows the stowed position of the unit 10, 12. The adjustment screws 76 have been loosened and the riser 12 has been swung downwardly into a substantially coplanar position with the collar 10. Then, the adjustment screws 76 are again tightened to hold the members together in this position.

Figure 9:
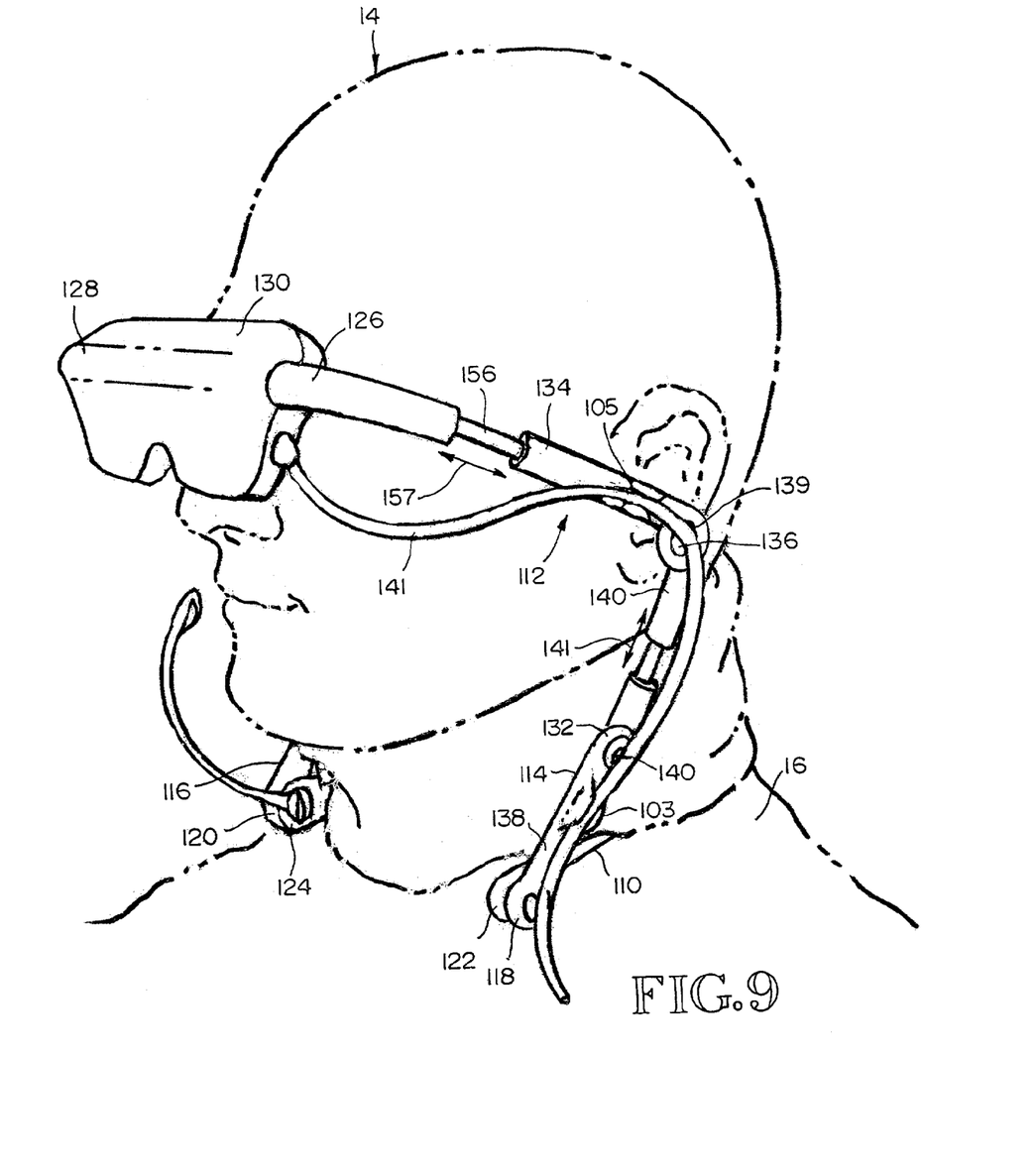
FIG. 9 is a view like FIG. 1 but showing a second embodiment of the personal video unit, such view showing a riser that has upper and lower sections that are pivotally connected together and which are movable in a jackknife fashion between open and closed positions.

FIGS. 9–12 illustrate another embodiment of the unit that is characterized by a substantially U-shaped collar 110 and an articulated riser 112. Riser 112 includes opposite arm portions 114, 116 having lower end portions 118, 120 that are pivotally attached to forward end portions 122, 124 of the collar 110. The arms 114, 116 extend upwardly from the end portions 122, 124 of the collar 110 and have upper end portions 126, 128 that are connected to a video viewer 130. Riser arms 114, 116 have upper and lower portions connected together by pivot joints. In FIG. 9, arm 114 is shown to comprise a lower arm portion 132, an upper arm portion 134 and a pivotal connection 136. Arm 132 has a lower portion 138 and an upper portion 140. The lower end of portion 138 includes end portion 118 that is connected to collar end portion 122. The opposite end of portion 132 is pivotally connected to one end of the portion 140. The opposite end of portion 140 is connected by the pivotal connection 136 to the upper portion 134.

In this embodiment, the cable 141 is secured to riser members 114, 134 by clips 103, 105. The clips 103, 105 include a slot that frictionally receives and engages a portion of the cable 141.

Figure 10:
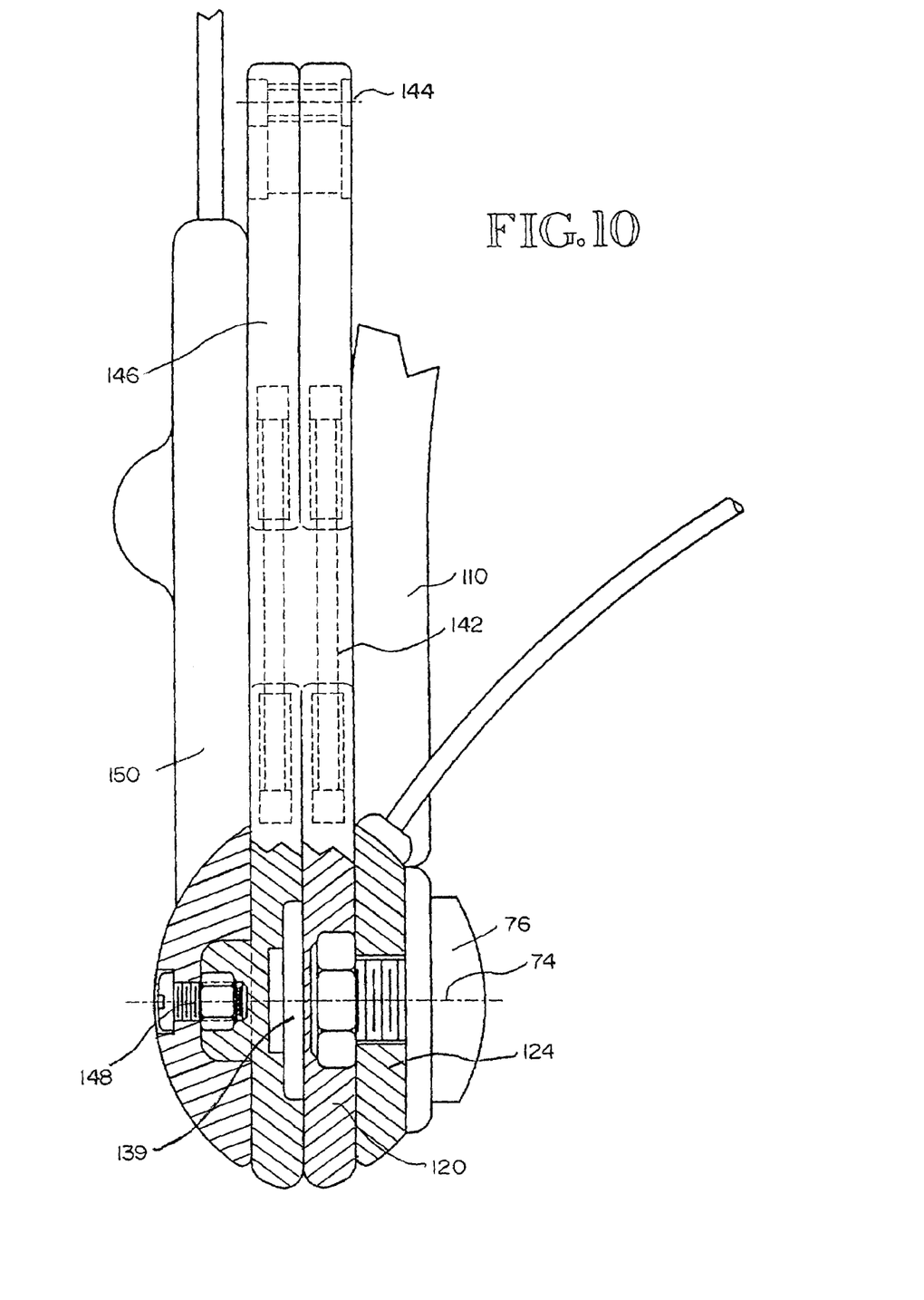
FIG. 10 is an enlarged scale fragmentary view of a portion of the embodiment shown by FIG. 9, showing the sections of the riser in a folded or stowed position and showing the riser and the collar in a folded condition.

In this embodiment, an earphone 139 is provided as apart of the pivotal connection 136. In use, the lower section of the riser arm extends upwardly and rearwardly from its connection to collar portion 122 a distance sufficient to place the earphone 139 generally outwardly of the ear of the user. FIG. 10 shows the stowed position of the earphone 139. A second earphone (not shown) is provided on the opposite side of the device in like fashion so that it is generally outwardly of the user's ear on that side of the device.

Referring to FIG. 10, arm portion 116 has three parts. A lower part 142 includes the end portion 120 that is pivotally connected to collar end portion 124. Part 142 is pivotally connected at 144 to part 146. Part 146 is pivotally connected at 148 to part 150. Part 142 is like part 138. Part 146 is like part 140. Part 150 is like part 134. The pivotal connection of collar end 122 with riser end 120 may be like the pivotal connection in the first embodiment. It includes an adjustment screw 76 that is loosened and tightened for allowing pivotal movement about axis 74. A lock nut may also be provided. The pivotal connections 144, 148 may also include a screw that is loosened to permit pivotal movement and then tightened to secure the parts together.

In this embodiment, the collar 110 may be constructed like the collar 10 in the first embodiment. That is, it is composed of forward side portions and a rear portion that together define a substantially U-shaped collar that is adjustable in size. Telescopic sections may be provided between the front and rear sections in order to provide the adjustment. The rear section may be constructed in the manner that is shown and described with respect to the first embodiment and it may include a clip or clamp for securing it to the collar on a user's shirt.

Figure 11:
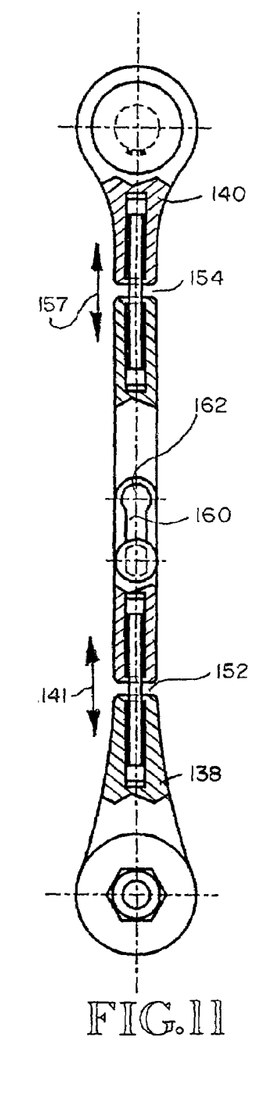
FIG. 11 is an elevational view of a modified construction of the riser arms, such view showing the arm in an unfolded or erect position, with parts of the view being shown in section and other parts being shown in elevation.
Figure 12:
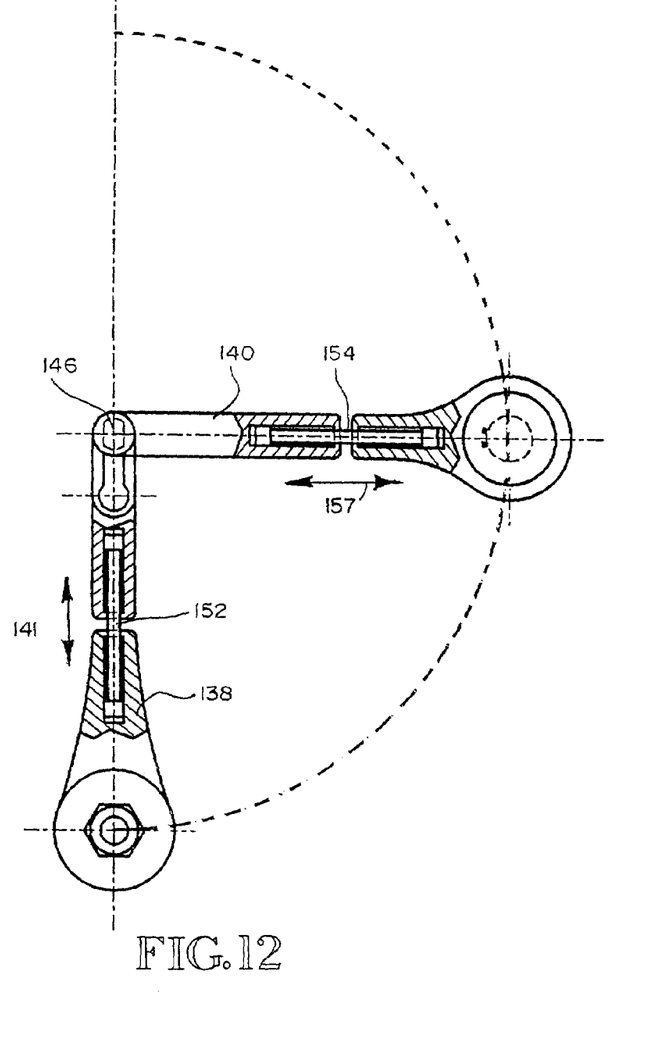
FIG. 12 is a view like FIG. 11, but showing one section of the arm in the process of being swung towards the other section, into a closed position for stowage.

In the embodiment shown by FIGS. 9–12 the riser portions 138, 140 may both be adjustable in length. As shown by FIGS. 11 and 12, each of these parts 138, 140 may comprise two end sections and a center section in the nature of a rod that is telescopically relieved in the end sections. In FIGS. 11 and 12, the rods are designated 152, 154, respectively. Each rod 152, 154 may be anchored in one end section and telescopically movable in the second end section. Or, they may be telescopically movable in both end sections. The end sections include sockets for receiving end portions of the rods 152, 154. There is a frictional fit between the walls of the sockets and the end portions of the rods 152, 154. FIGS. 9 and 10 include arrows 141, 157 that show where the adjustment occurs.

The pivot connection 140 may be provided by a bolt that between its ends includes a shank 146 having a cross sectional shape that is flattened on opposite sides, as shown in FIGS. 11 and 12. This shank 146 fits snuggly within a slot 160 that has a circular cavity 162 at its outer end. When the shank 160 is within the cavity 162, it can be rotated in position. When the shank is within the straight section 160, its flat side surfaces are contiguous the flat side surfaces of the straight section. This relationship prevents rotation but rather holds the two end portions 138, 140 in an axial alignment (FIG. 11). Starting with the end portions 138, 140 in axial alignment, a user can move the two end portions 138, 140 together, and move the bolt shank with flattened sides into the circular cavity 162. Once the bolt shank is within the cavity 162, the end portion 140 can be pivotally moved relative to the end portion 138, as shown in FIG. 12.

Referring to FIG. 9, the collar or collar 110 is adjusted to fit the neck of a user 14. As in the first embodiment, the collar 110 is set down on the user's shoulder 16, with the collar forward end portions 120, 122 directed forwardly and resting on an upper portion of the chest of the user 14. The riser 112 is adjusted to fit the user 14. The lower part of the riser side arms is moved to put the end portions 138, 140 into axial alignment, as described in connection with FIGS. 11 and 12. The length of the lower section 132 is adjusted to place the pivot connection 136 at about the level of the user's ears. In this embodiment, earphones are built into the pivotal connections. See 141 in FIG. 10. The upper section 134 is suitably positioned and adjusted in length so that the video viewer 130 is properly positioned relative to the user's eyes. The upper side portions 134, 150 of the riser 112 are preferably made adjustable in the same way that the collar 110 is made adjustable. They include end sections that are interconnected by a rod 156 that is either connected to one end section and telescopically movable relative to the other, or is telescopically movable in both end sections.

Referring again to FIG. 9, when the embodiment of FIGS. 9–12 is installed on a user 14, the collar or collar 110 is around the neck of the user 14 and sets on the user's shoulders 16. The riser 112 first extends upwardly and rearwardly from the forward end portions 120, 122 of the collar 110, substantially to the level of the user's ears. This places the earphones 141 adjacent the user's ears. Then the upper sections 134, 150 of the riser 112 extend upwardly and forwardly to the video viewer 130.

When it is desired to stow the unit shown by FIGS. 9–12, the unit is removed from the user's neck. Sections 138, 140 of lower riser arm portion 114 are folded together, in a jackknife fashion. The folded arm portion 114 is then itself folded in a jackknife fashion relative to the ends of the collar or collar 110. The upper part 134, 150 of the riser 112 is also pivoted in jackknife fashion to place the portions 134, 150 into the position shown by FIG. 10 with respect to portion 150. In this position, the collar arm, the sections 142, 146 of the lower part of the riser 114 and the upper parts 134, 150 of the riser 112 are all in a side-by-side relationship substantially within a common plane. This provides the stowed position for the embodiment shown by FIGS. 9–12.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather are to be determined by the following claims, interpreted according to accepted doctrines of patent claim interpretation, including use of the doctrine of equivalents and reversal of parts.

What is claimed is:

1. A shoulder mounted device, comprising:
   a collar adapted to extend around a user's neck and set down on the user's shoulders, said collar having left and right forward end portions that are adapted to be positioned forwardly of the user's neck and above the user's chest when the collar is down on the user's shoulders;
   a riser having left and right arms including left and right upper end portions and left and right lower end portions, said left lower end portion of the riser being connected to the left forward end portion of the collar, and said right lower end portion of the riser being connected to the right forward end portion of the collar; and an eye-confronting unit extending between and connected to the left and right upper end portions of the arms of the riser, wherein when the collar is positioned on a user's neck and shoulders, the eye-confronting unit is positioned forwardly of the eyes of the user.

2. The device of claim 1, wherein the collar is adjustable to fit the neck of the user.

3. The device of claim 2, wherein the collar includes left and right end section that are connected to the left and right forward end portions, and a rear section that is adjustably connected to the left and right sections.

4. The device of claim 1, wherein the left and right forward end portions of the collar are pivotally connected to the left and right lower end portions of the riser by pivotal connections permitting pivotal movement of the riser in position relative to the collar.

5. The device of claim 1, wherein the left and right arms of the riser are adjustable in length.

6. The device of claim 5, wherein the left and right arms have upper and lower sections and a connection between the upper and lower sections which provides for adjustment of the eye-confronting unit in position relative to the left and right lower end portions of the riser.

7. The device of claim 1, wherein the eye-confronting unit is pivotal in position relative to the left and right upper end portions of the arms of the riser.

8. The device of claim 1, wherein the eye-confronting unit includes a video viewer.

9. The device of claim 8, further comprising an earphone connectable to the user's ear and an audio cord extending from the earphone to the eye-confronting unit.

10. The personal video unit of claim 8, wherein the collar is adjustable to fit the neck of a user.

11. The personal video unit of claim 8, wherein the collar is U-shaped and includes left and right end sections that are connected to the left and right forward end portions, and a rear section that is adjustably connected to the left and right sections.

12. The device of claim 1, wherein the left and right forward end portions of the collar are pivotally connected to the left and right lower end portions of the riser by pivotal connections permitting pivotal movement of the riser in position relative to the collar, and wherein the left and right arms of the riser are adjustable in length.

13. The device of claim 12, wherein the collar is adjustable in size between the left and right forward end portions of the collar.

14. The device of claim 13, wherein the eye-confronting unit is a video viewer is pivotal in position relative to the left and right upper end portions of the arms of the riser.

15. The device of claim 14, wherein the left and right arms of the riser have upper and lower sections that are pivotally connected together by a pivotal connection, and the lower sections are adapted to extend upwardly and rearwardly from the left and right lower end portions of the riser to the pivotal connection, and the upper sections are adapted to extend upwardly and forwardly from the pivotal connection to the video viewer.

16. The device of claim 15, wherein the left and right forward end portions of the collar are pivotally connected to the left and right forward end portions of the riser, said pivotal connections permitting pivotal movement of the riser in position relative to the collar.

17. The device of claim 16, wherein the eye-confronting unit is pivotal in position relative to the left and right upper end portions of the arms of the riser.

18. The device of claim 15, wherein the pivotal connection between the upper and lower sections of the riser arms are positioned generally outwardly of the user's ears, and wherein at least one riser arm includes an earphone that is positioned generally outwardly of the user's ears.

19. The device of claim 18, wherein each riser arm includes an earphone, one of which is positioned generally outwardly of the left ear of the user and the other is positioned generally outwardly of the right ear of the user.

20. The device of claim 14, wherein the lower end portions of the left and right arms of the riser are adjustable in length.

21. The device of claim 14, wherein the upper end portions of the left and right arms of the riser are adjustable in length.

22. The device of claim 14, wherein the collar is adjustable in size to fit the user's neck.

23. The device of claim 22, wherein the collar includes left and right end sections that are connected to the left and right forward end portions, and a rear section that is adjustably connected to the left and right sections.

24. The device of claim 1, wherein the collar and the riser are foldable together for stowage.

* * * * *